United States Patent [19]

Broyhill

[11] Patent Number: 5,310,115

[45] Date of Patent: May 10, 1994

[54] SPRAYER HAVING A FOLDING BOOM

[75] Inventor: Craig G. Broyhill, Dakota City, Nebr.

[73] Assignee: The Broyhill Company, Dakota City, Nebr.

[21] Appl. No.: 803,048

[22] Filed: Dec. 6, 1991

[51] Int. Cl.⁵ .......................... B05B 1/16; B05B 1/20
[52] U.S. Cl. ....................................... 239/168; 239/170
[58] Field of Search ................................ 239/168, 170

[56] References Cited

U.S. PATENT DOCUMENTS

| | | | |
|---|---|---|---|
| Re. 33,817 | 2/1992 | Tyler | 239/170 X |
| 2,602,684 | 7/1952 | Pinke | 239/168 X |
| 2,619,379 | 11/1952 | Skifte | 239/168 |
| 2,770,493 | 6/1957 | Fieber | 239/168 |
| 3,301,487 | 1/1967 | Young | 239/168 |
| 3,395,503 | 1/1967 | Greenburg et al. | 52/114 |
| 3,425,628 | 2/1969 | Reams | 239/168 |
| 3,581,993 | 6/1971 | Reams | 239/168 X |
| 3,814,320 | 6/1974 | Skurray | 239/168 X |
| 3,866,834 | 2/1975 | Shannon | 239/167 |
| 4,044,952 | 8/1977 | Williams et al. | 239/168 X |
| 4,372,492 | 2/1983 | Blumenshine | 239/168 |
| 4,441,655 | 4/1984 | Blumhardt | 239/163 |
| 4,588,128 | 5/1986 | Broyhill et al. | 239/168 |
| 4,650,124 | 3/1987 | Connaughty et al. | 239/168 X |

FOREIGN PATENT DOCUMENTS 2560533 9/1985 France ............................... 239/168
1349356 4/1974 United Kingdom ............... 239/168

*Primary Examiner*—Andres Kashnikow
*Assistant Examiner*—Lesley D. Morris
*Attorney, Agent, or Firm*—Zarley, McKee, Thomte, Voorhees & Sease

[57] ABSTRACT

A sprayer having a folding boom is disclosed which includes a main spray bar mounted at the rear end of a small vehicle or a trailer. First and second intermediate boom sections are pivotally connected, about horizontal axes, to the outer ends of the means spray bar and have wheels at the outer end thereof so that the intermediate boom sections will remain positioned above the ground regardless of the terrain encountered by the sprayer. First and second outer boom sections are pivotally mounted, about horizontal axes, to the outer ends of the intermediate boom sections. The outer boom sections may be folded onto the intermediate boom sections and when the outer boom sections are so folded, the spray nozzles thereon are rendered inoperative. The intermediate boom sections, with the outer boom sections folded thereon, may also be moved to a folded position relative to the vehicle. When the intermediate boom sections have been so folded, the spray nozzles thereon are rendered inoperative.

6 Claims, 5 Drawing Sheets

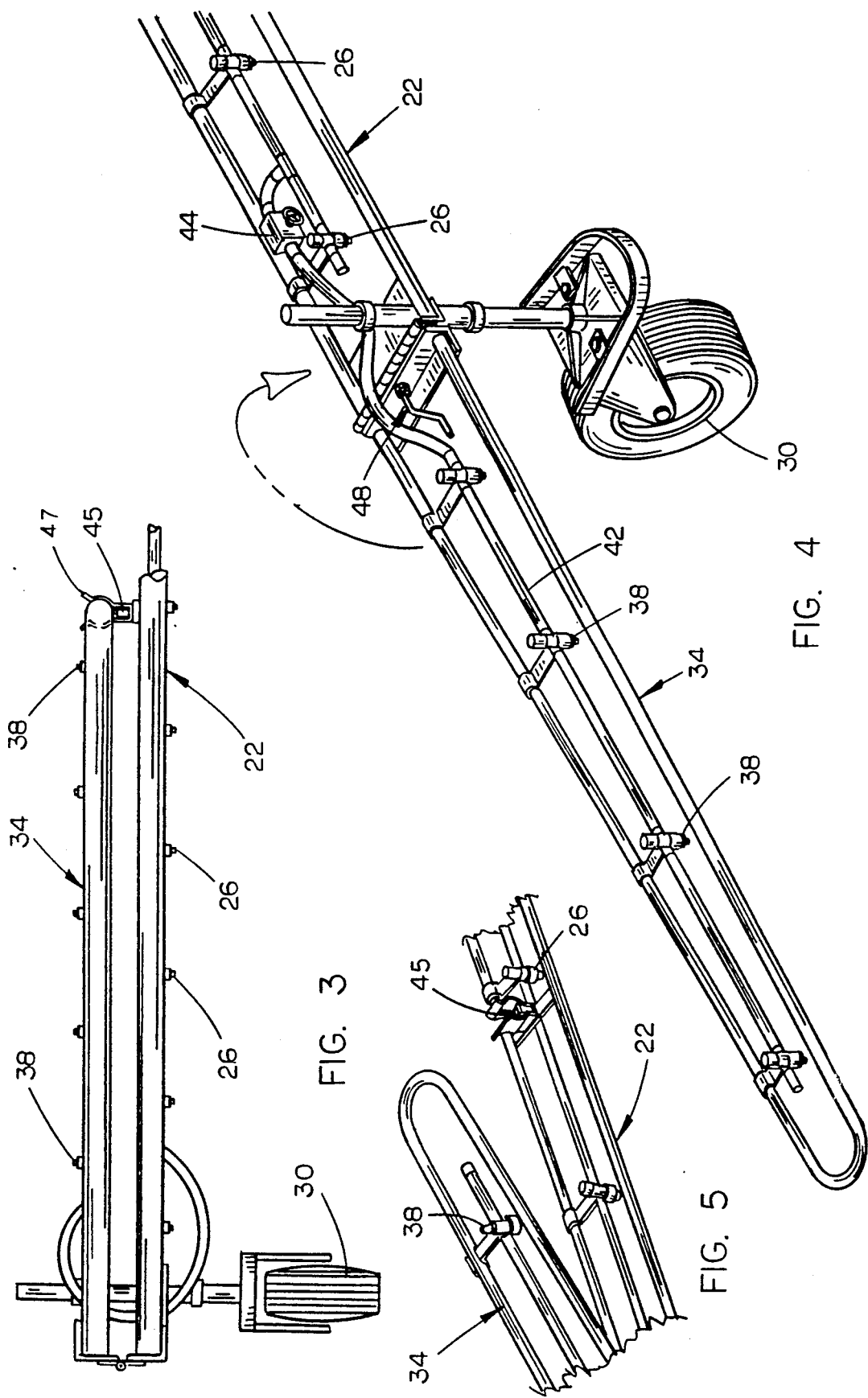

SPRAYER HAVING A FOLDING BOOM

BACKGROUND OF THE INVENTION

This invention relates to a sprayer and more particularly to a sprayer having boom sections at the outer end thereof which may be pivoted or folded with respect to the remainder of the spray boom.

Many types of sprayers have been previously provided for spraying fields, golf courses, yards, etc. The conventional sprayers normally include an elongated spray bar which extends transversely to the direction of movement of the vehicle pulling or supporting the sprayer. Many prior art devices have utilized folding boom sections for the sprayers to enable the sprayers to be positioned in either a field position or a transport position. However, when the folding boom sections of the conventional sprayers are positioned in the transport position, the non-folded spray boom section is incapable of being used. This is somewhat disadvantageous since it is frequently desirable to spray areas having a width less than the full width of the spray bar.

It is therefore a principal object of the invention to provide an improved sprayer.

A further object of the invention is to provide a sprayer having pivotal or folding boom sections at the outer end thereof with means being provided to render the spray nozzles on the boom sections inoperative when the boom sections are in their folded condition.

Yet another object of the invention is to provide a sprayer having folding boom sections wherein the boom sections are quickly and easily folded from an operative position to a folded positions and vice-versa.

Yet another object of the invention is to provide a sprayer which permits the sprayer to be used on irregular terrain such as commonly experienced in spraying golf courses having hills, mogules, etc.

These and other objects of the invention will be apparent to those skilled in the art.

BRIEF DESCRIPTION OF THE DRAWINGS

FIG. 3 is a partial front view of the sprayer of this invention illustrating one of the outermost boom sections in its folded position;

FIG. 4 is a partial front perspective view illustrating one of the outermost boom sections in its operative position;

FIG. 5 is a partial perspective view of the boom section of FIG. 3 being lowered into its inoperative position;

SUMMARY OF THE INVENTION

Figure 1:
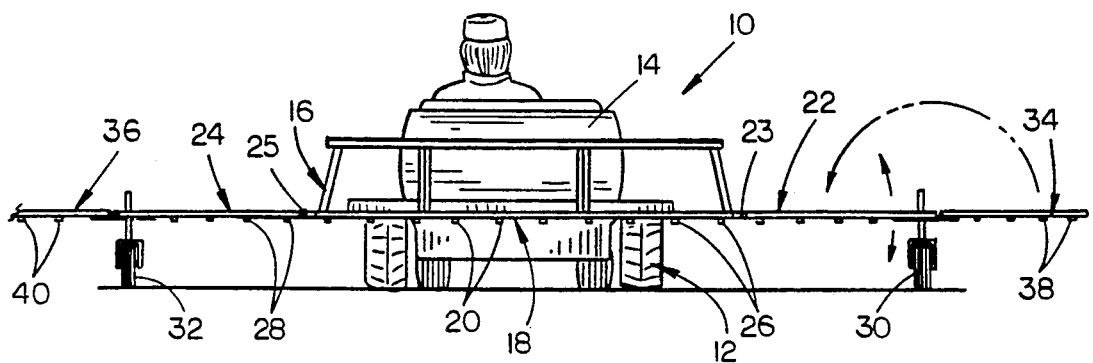
FIG. 1 is a rear view of the sprayer of this invention.
Figure 2:
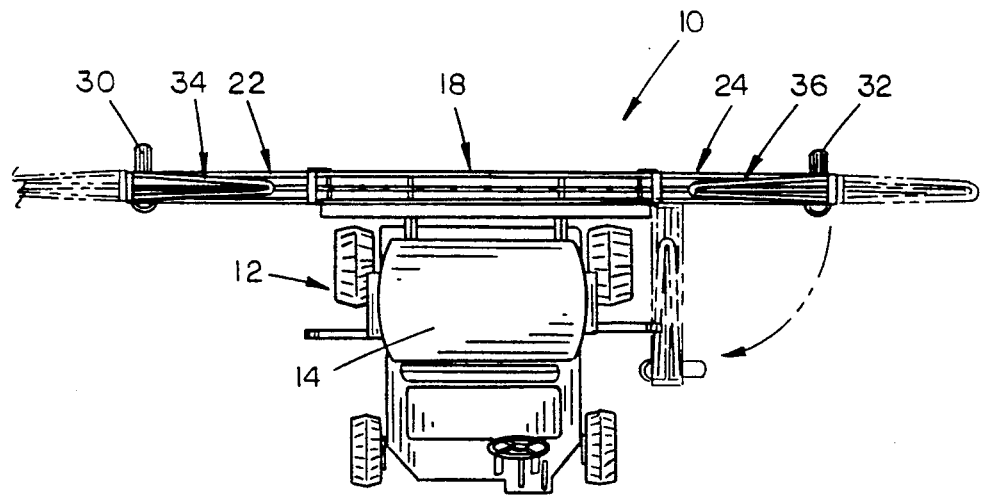
FIG. 2 is a top view of the sprayer of this invention with the outermost boom sections having been folded to an inoperative position.

An improved sprayer is disclosed including a main spray bar assembly which is mounted at the rear end of a small vehicle or trailer. First and second intermediate boom sections are pivotally connected, about horizontal axes, to the outer ends of the main spray bar and have wheels at the outer end thereof so that the first and second intermediate boom sections will remain positioned a predetermined distance above the ground regardless of the terrain encountered by the sprayer. First and second outer boom sections are pivotally mounted, about horizontal axes, to the outer ends of the first and second intermediate boom sections and may be pivotally moved from an operative position to a transport or storage position on top of the first and second intermediate boom sections respectively. Spray nozzles are provided on the main spray bar, the first and second intermediate boom section, and the first and second outer boom sections. Means is provided for rendering the spray nozzles on the outer boom sections inoperative when the outer boom sections are positioned on top of the first and second intermediate boom sections. Means is also provided for rendering the spray nozzles on the intermediate boom sections inoperative when the intermediate boom sections are folded or pivoted to their inoperative positions. The width of the sprayer may quickly and easily be changed by simply folding one or more of the outer boom sections onto its respective intermediate boom section.

DESCRIPTION OF THE PREFERRED EMBODIMENT

The numeral 10 refers generally to the sprayer of this invention. The drawings illustrate the sprayer 10 being mounted at the rear of a small vehicle 12 but the same may be mounted on a suitable trailer or the like if so desired. Spray tank 14 is mounted on the vehicle 12 and would include a pump 13 for pumping chemicals from the spray tank to the nozzles on the boom sections of the sprayer which will be described in more detail hereinafter.

The numeral 16 refers to the sprayer frame having a main spray bar or boom section 18 positioned thereon, including a plurality of horizontally spaced nozzles 20. Intermediate boom sections 22 and 24 are pivotally mounted, about horizontal axes, to the outer ends of the boom section 18, at 23 and 25 respectively, and have a plurality of spray nozzles 26 and 28 positioned thereon respectively. Ground engaging wheels 30 and 32 are mounted on the outer ends of boom sections 22 and 24 respectively to maintain the outer ends of the boom sections 22 and 24 out of ground engagement and to maintain the outer ends of the boom sections 22 and 24 the proper distance above the ground to be sprayed.

Folding outer boom sections 34 and 36 are pivotally mounted, about horizontal axes, to the outer ends of boom sections 22 and 24 respectively. A plurality of nozzles 38 are provided on boom section 34 while a plurality of spray nozzles 40 are mounted on boom section 36. Nozzles 38 are in communication with a conduit 42 which is in communication with the nozzles 26 on boom section 22. Valve 44 is provided at the inner end of conduit 42 to permit the discontinuance of chemical to the nozzles 38 when the boom section 34 is in its folded condition. Valve 44 may be manually operated if desired. However, it is preferred that valve 44 be controlled by a switch 45 positioned in bracket 47 so that switch 45 will close valve 44 when the boom section is in its folded position as seen in FIG. 3. The nozzles 40 on boom section 36 are controlled in a manner identical to that just described to prevent the flow of chemicals to the nozzles 40 when the boom section 36 is folded onto boom section 24.

Figure 6:
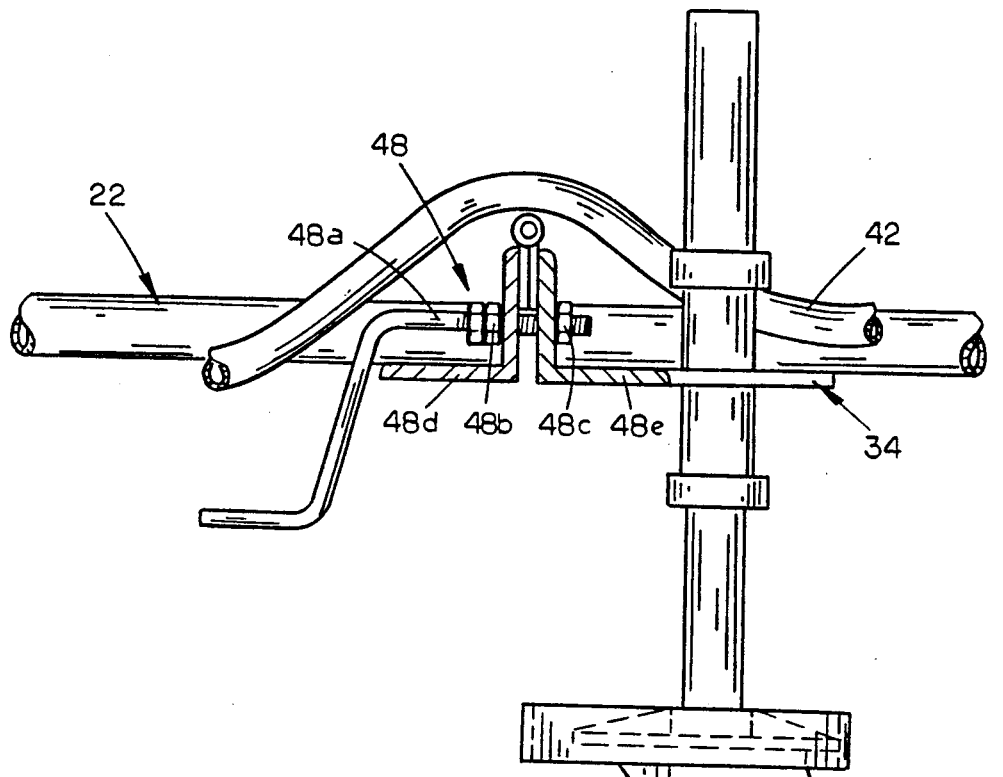
FIG. 6 is a sectional view illustrating the means for locking the outermost boom in its field position.
Figure 7:
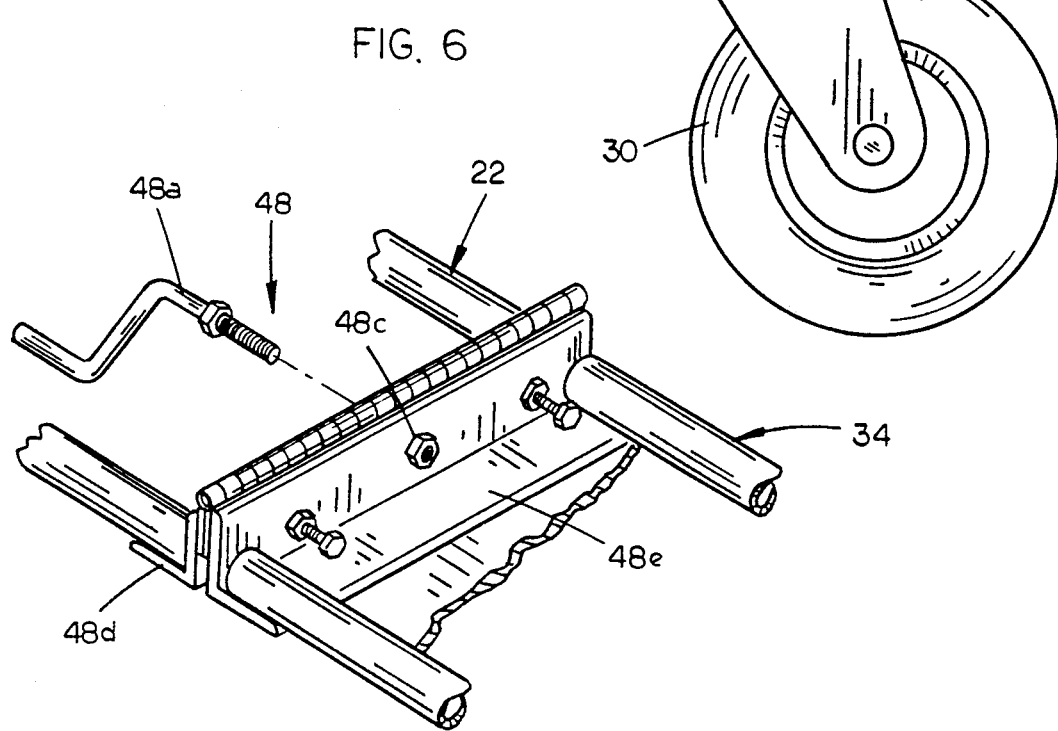
FIG. 7 is a partial perspective view further illustrating the means for locking an outermost boom section in its field position.
Figure 8:
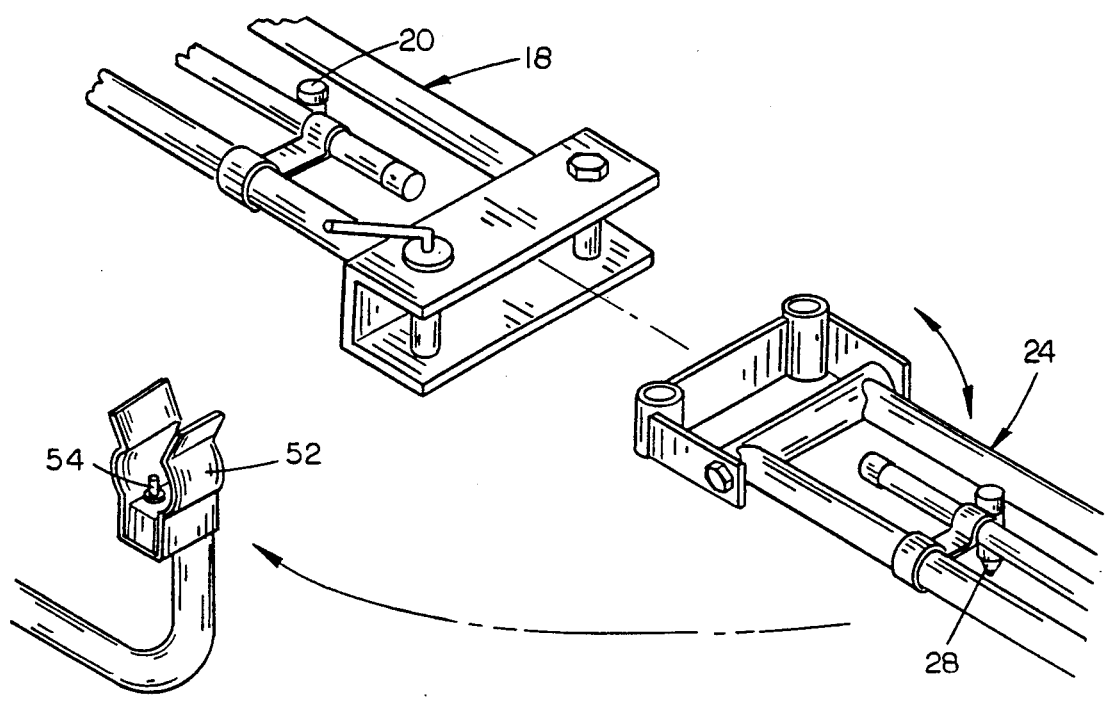
FIG. 8 is a partial perspective view illustrating the manner in which the intermediate boom section is folded forwardly with respect to the main boom section.
Figures 9, 10:
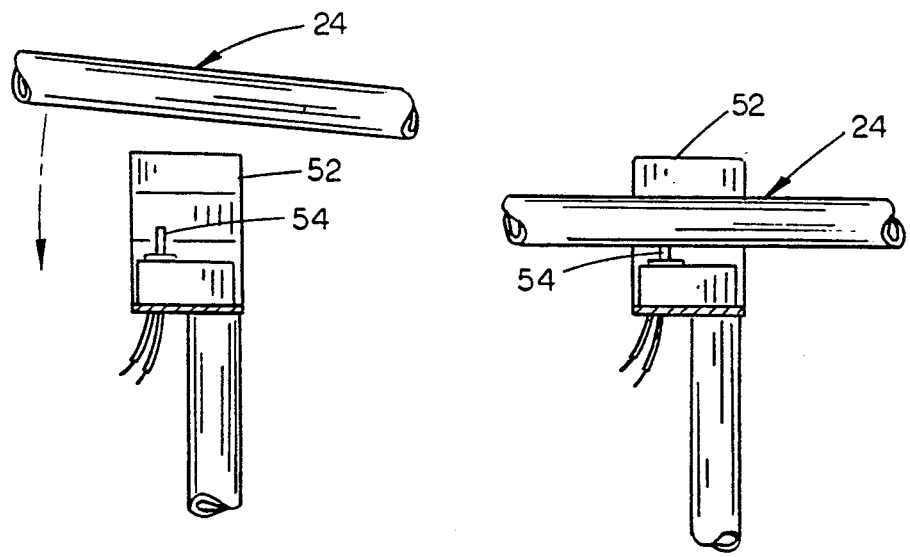
FIG. 9 is a sectional view illustrating the manner in which the intermediate boom section is lowered into a supporting bracket.
FIG. 10 is a view similar to FIG. 9 except that the intermediate boom section has been lowered into engagement with a switch positioned in the supporting bracket.
Figure 11:
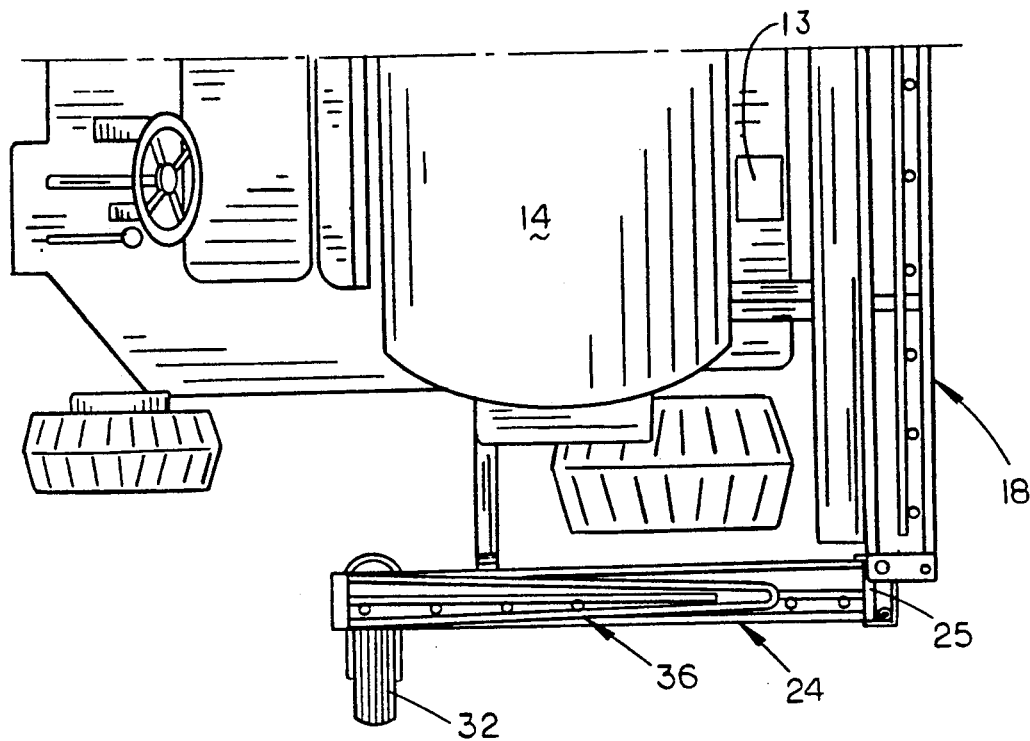
FIG. 11 is a partial top view illustrating the outer boom section and intermediate boom section positioned in an inoperative position.
Figure 12:
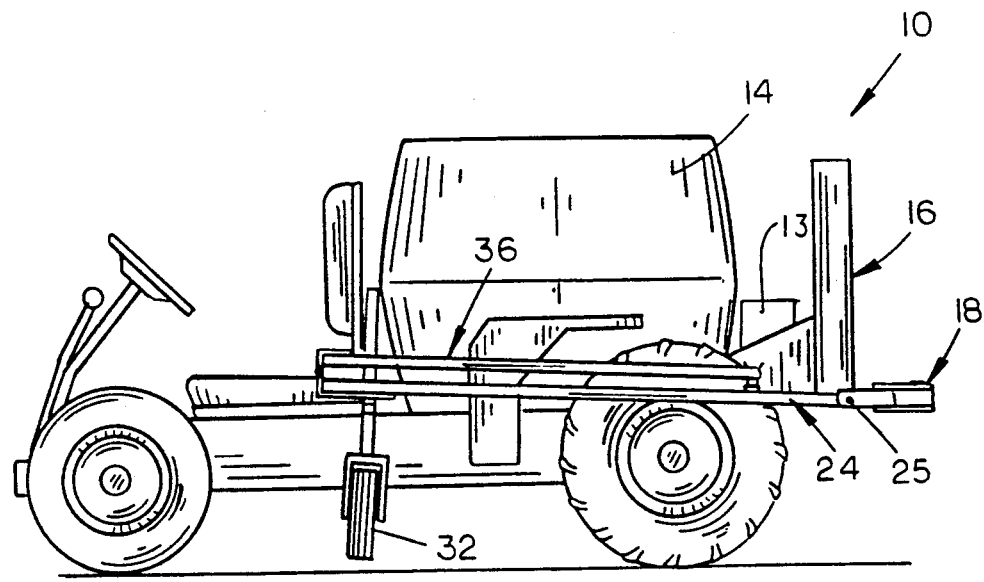
FIG. 12 is a side view of the sprayer having the outer boom section and intermediate boom section positioned in an inoperative position.

Locking means 48 is provided between boom section 34 and boom section 22 to maintain the boom section 34 in its operative position. Similarly, locking means 50 (not shown) is provided between boom section 36 and boom section 28 to maintain boom section 36 in its operative position. As seen, locking means 48 includes a crank or handle 48a which is threadably received by nuts 48b and 48c welded to angles 48d and 48e, respectively. Thus, when crank 48a is in the position of FIG. 6, boom section 34 is locked in its operative position.

Thus, when the boom sections 34 and 36 are in their operative position, the width of the sprayer will be at a maximum. The locking means 48 and 50 prevent the boom sections 34 and 36 from inadvertently pivoting or bouncing with respect to the boom sections 22 and 24 as the sprayer is being used. When it is desired to spray a width less than the total width of the sprayer, either or both of the boom sections 34 and 36 may be pivoted or folded to their inoperative or folded positions with the valves 44 and 46 being closed to prevent chemicals from being supplied to the boom section or boom sections.

The boom sections 22 and 24 may also be pivotally moved or folded forwardly with respect to boom section 18 for transport purposes or for when only boom section 18 is needed for spraying purposes. The pivotal connection between boom section 24 and boom section 18 and the pivotal connection between boom section 22 and boom section 18 permit the intermediate boom sections to "break-away" should the outer wing section or intermediate wing section strike an obstruction. The pivotal connection of boom section 24 with boom section 18 and the pivotal connection of boom section 22 with boom section 18 is described in U.S. Pat. No. 4,588,128 which is incorporated herein by reference.

When it is desired to place the sprayer in a transport position or when it is desired to spray only with boom section 18, outer boom sections 34 and 36 are folded upon intermediate boom sections 22 and 24, respectively, which render the nozzles 38 and 40 inoperative thereby preventing injury to the operator should the operator inadvertently forget to deactivate the nozzles 38 and 40. The intermediate boom sections 22 and 24 are then folded forwardly with respect to the vehicle with the intermediate boom section being received by a bracket as will now be described. Intermediate boom section 24 is adapted to be received by a support bracket 52 having a switch 54 mounted thereon. Bracket 52 not only maintains the intermediate boom section 24 in its folded position but provides a means for deactivating the nozzles 28 on the intermediate boom section 24. Switch 54 is operatively connected to a valve which is in communication with the nozzles 28 so that the nozzles 28 cannot be activated when the boom section 24 is in its folded position thereby preventing possible injury to the sprayer operator. If desired, the switch 54 could also be operatively connected to a valve controlling the nozzles 20 on boom section 18 so that the nozzles on boom section 18 are also deactivated when the sprayer is in its transport position.

It can therefore be seen that a novel sprayer has been provided which can be quickly and easily modified so as to have a width less than the maximum width should the need arise. It can also be seen that a safety means has been provided to disable the spray nozzles on the associated boom section when the boom section is folded. It can therefore be seen that the invention accomplishes at least all of its stated objectives.

I claim:

1. A sprayer comprising,
   a wheeled frame means,
   a liquid spray tank on said wheeled frame means,
   a pump means operatively connected to said spray tank for pumping liquid therefrom,
   a horizontally disposed, main spray bar on said wheeled frame means and having opposite ends,
   a first intermediate boom section pivotally secured, about a horizontal axis, to one end of said main spray bar,
   a second intermediate boom section pivotally mounted, about a horizontal axis, to the other end of said main spray bar,
   a first outer boom section pivotally connected, about a horizontal axis, to the outer end of said first intermediate boom section,
   a second outer boom section, pivotally connected, about a horizontal axis, to the outer end of said second intermediate boom section, said first and second outer boom sections being selectively pivoted between operative positions and folded positions,
   said first and second outer boom sections being positioned on said first and second intermediate boom sections, respectively, when in their said folded positions,
   said main spray bar having a plurality of spray nozzles mounted thereon,
   said first intermediate boom section, said second intermediate boom section, said first outer boom section and said second outer boom section having a plurality of spray nozzles mounted thereon,
   said nozzles being operatively connected to said pump means,
   and means for interrupting the flow of liquid only to the nozzles on said first and second outer boom sections when said first and second outer boom sections are in their said folded positions.

2. The sprayer of claim 1 including means for locking said first and second outer boom sections in their operative positions.

3. The sprayer of claim 1 wherein said each of first and second intermediate boom sections are also pivotally secured about a vertical axis to said spray bar so that they are movable between operative and transport positions, and means for interrupting the flow of liquid to the nozzles on said intermediate boom sections when said intermediate boom sections are in their transport position.

4. The sprayer of claim 1 wherein said means for only interrupting the flow of liquid to the nozzles on said first and second outer boom sections is automatic.

5. The sprayer of claim 3 wherein said means for interrupting the flow of liquid to the nozzles on said first and second intermediate boom sections is automatic.

6. The sprayer of claim 1 wherein first and second wheel means are operatively mounted on said first and second intermediate boom sections respectively for supporting the same.

* * * * *